United States Patent Office 3,224,106
Patented Dec. 21, 1965

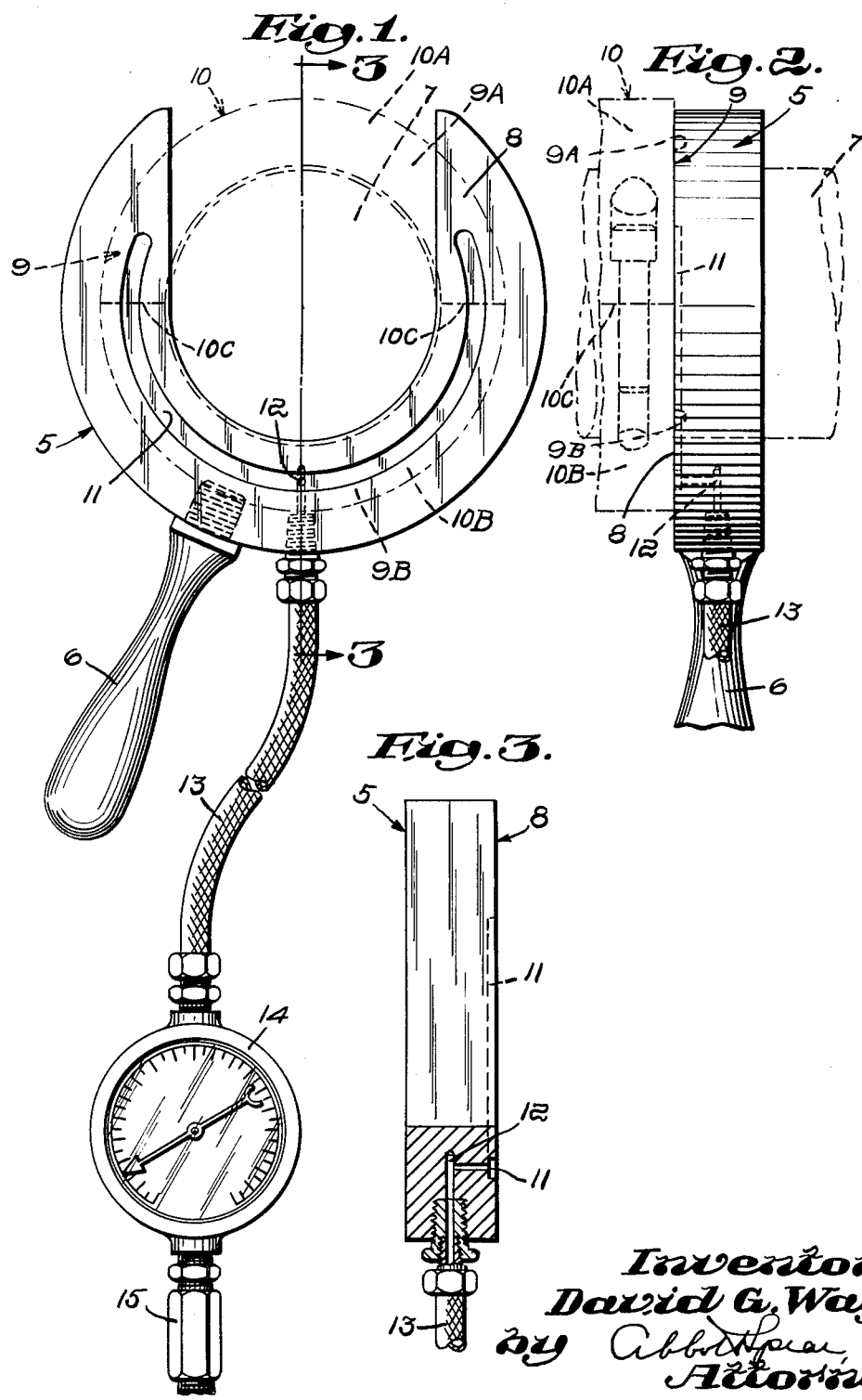

3,224,106
METHOD AND APPARATUS FOR USE IN ASSEMBLING RING SECTIONS ABOUT A SHAFT WITH THEIR END FACES CO-PLANAR
David G. Way, Boxborough, Mass.
(R.F.D., West Acton, Mass.)
Filed May 31, 1961, Ser. No. 113,913
4 Claims. (Cl. 33—180)

The present invention relates to methods and apparatus for use in assembling the two halves of a split ring about a shaft so that their end faces are co-planar.

While the invention is adapted for other uses, it is herein discussed in connection with pump shaft seals of the type including rings having face-to-face sealing surfaces. The installation and replacement of such seals is a serious problem since the baring of a shaft to enable the rings to be slipped into place over the end thereof is often as expensive and time-consuming as a major repair of the pump.

In my co-pending application, Serial No. 94,893, filed March 10, 1961, I have shown, described and claimed shaft seals which include rings of the type above referred to but made in sections so that they can be assembled about a shaft from one side thereof thus to substantially reduce the time involved in the installation and replacement of shaft seals. The ring sections, preferably two in number, have their seal-establishing end faces lapped to be flat, typically within a few light bands, and such operations are performed preferably with the sections clamped together to form the ring. In order for such a sectioned ring to be used, it must be re-assembled by joining its sections together about the shaft and its seal-establishing end face must also be accurately re-established which requires that the end faces of the ring sections be co-planar when clamped together.

The present invention is concerned with the trueing of the sealing ring end faces and the testing thereof to ensure that they function as well as if they were unitary. In accordance with the invention, these general objectives are attained by assembling the ring sections about the shaft with their mating edges in contact and with their end faces approximately co-planar but free to move, bringing the end faces and a plane test surface into mutual engagement, the test surface being approximately as smooth and flat as the end face of the ring sections and of an area sufficient to be engaged by a substantial portion of both end faces, and then applying pressure to the ring to force and hold said sections together and against the test surface to bring each end face in planar contact therewith. The sections are then positioned to be locked together.

It is preferred to use suction to cause or to assist in such interengagement between the ring sections and between the end faces of the ring sections and the test surface and to use the amount of suction held between the re-established ring face and the test surface as a measure of the flatness of the ring face.

In accordance with the invention, a device for such uses comprises a shaft-straddling yoke provided with a flat test face dimensioned to enable substantial portions of the end faces of both rings to engage therewith at the same time and, where suction is to be used, the inlet of the suction conduit is in the form of a channel, typically in the form of an arc of more than 180° in length. The conduit is provided, for testing purposes, with a vacuum gauge and, usually, with a check valve, as well.

In the accompanying drawings, there is shown an illustrative embodiment of the invention from which these and other of its objectives, novel features and advantages will be readily apparent.

In the drawings:
FIG. 1 is a view of the device, shown as straddling an indicated shaft and having an indicated ring overlying its lapped, test surface,
FIG. 2 is a side view of the device, and
FIG. 3 is a section taken approximately along the indicated lines 3—3 of FIG. 1.

In the embodiment of the invention illustrated by the drawings, the trueing device is shown as comprising a yoke 5 provided with a handle 6 and dimensioned to straddle a shaft, such as the indicated shaft 7, and to have a test surface 8 for engagement by the major portion of the end face 9 of a sectioned ring, such as the indicated ring 10.

The ring 10 is shown as comprising sections 10A and 10B with the joint between them being indicated at 10C. It may be assumed that the end face 9 has been lapped to be flat within desired limits, while the ring 10 was assembled, and the lapped ends of the sections 10A and 10B are indicated at 9A and 9B, respectively.

The end face 9, typically, is to be one part of a face-to-face shaft seal and it will be apparent that it is necessary that the ring sections 10A and 10B be so assembled that their end faces 9A and 9B so merge, one with the other, as to lose their identity and re-establish the end face 9. When the faces 9A and 9B are both fully seated against the test face 8, they are co-planar. In practice, the ring sections 10A and 10B are united about the shaft 7 with their mating edges in contact and with their faces 9A and 9B approximately co-planar but still free to move. The device is then disposed with its yoke 5 straddling the shaft 7, and with substantial portions of the end faces 9A and 9B seated against the test face 8, the sections 10A and 10B may be securely locked together. It is preferred that the yoke 5 traverses the joints 10C.

It is difficult, as a manual operation, to maintain the end faces 9A and 9B in co-planar contact with the test face 8 while the sections 10A and 10B are being clamped together. For that reason, the test face 8 is provided with a channel 11, closed at its ends, and preferably defining an arc of more than 180°, that shown being close to 240°, and constituting the inlet of a conduit 12 shown as extending through the yoke and connected to a flexible tube 13. The tube 13 is adapted to be connected to a suitable vacuum pump, not shown, and is provided with a gauge 14 and a check valve 15.

With a device in accordance with the invention, suction is operative to draw and hold the sections 10A and 10B together to form tight joints 10C and to draw and hold the faces 9A and 9B against the test surface 8. At the same time, the reading of the vacuum gauge 14 indicates to the user whether the joints 10C and the joint between the end faces and the test surface are tight. If the last named joint is tight, it follows that the end faces 9A and 9B are co-planar.

I claim:
1. A device for use with a ring formed in half sections to enable it to be assembled about a shaft and provided, while assembled, with a flat face, said device being for use in re-establishing said face when the sections are assembled about said shaft, said device including a shaft-straddling yoke provided with a flat test face for engagement by substantial portions of the face-establishing surfaces of said ring sections, said device including a conduit having an inlet and an outlet attachable to a suction source, and said test face being channeled to define said inlet.

2. A device for use with a ring formed in half sections to enable it to be assembled about a shaft and provided, while assembled, with a flat face, said device being for use in re-establishing said face when the sections are assembled about said shaft, said device including a shaft-straddling yoke provided with a flat test face for engagement by substantial portions of the face-establishing surfaces of said ring sections, said device including a conduit having an inlet, and an outlet attachable to a suction source, said test face being channeled to define said inlet, and said outlet including a gauge.

3. A device for use with a ring formed in half sections to enable it to be assembled about a shaft and provided, while assembled, with a flat face, said device being for use in re-establishing said face when the sections are assembled about said shaft, said device including a shaft-straddling yoke provided with a flat test face for engagement by substantial portions of the face-establishing surfaces of said ring sections, said device including a conduit having an inlet, and an outlet attachable to a suction source, said test face being channeled to define said inlet, and said outlet including a gauge and a check valve.

4. A device for use with a ring formed in half sections to enable it to be assembled about a shaft and provided, while assembled, with a flat face, said device being for use in re-establishing said face when the sections are assembled about said shaft, said device including a shaft-straddling yoke provided with a flat test face for engagement by substantial portions of the face-establishing surfaces of said ring sections, said test face having an arcuate channel whose ends are closed and spaced more than 180° apart and located each in an arm of said yoke, and said device including a conduit in communication with said channel and attachable to a suction source.

References Cited by the Examiner
UNITED STATES PATENTS

| | | | |
|---|---|---|---|
| 1,870,715 | 8/1932 | Delany | 29—468 |
| 1,941,022 | 12/1933 | Shelley | 29—468 |
| 2,013,374 | 9/1935 | Zimmerman | 33—180 |
| 2,366,935 | 1/1945 | Schmid. | |
| 2,782,574 | 2/1957 | Copold | 279—3 |
| 2,832,602 | 4/1958 | Coupe | 279—3 |
| 2,955,829 | 10/1960 | Brewster | 279—3 |

ISAAC LISANN, *Primary Examiner.*

W. A. WILTZ, *Examiner.*